United States Patent [19]

Harries

[11] 3,995,069

[45] Nov. 30, 1976

[54] EMULSIFIER SYSTEMS

[75] Inventor: Peter Conroy Harries, Hitchin, England

[73] Assignee: Internationale Octrooimaatschappij "Octropa", Rotterdam, Netherlands

[22] Filed: Apr. 21, 1975

[21] Appl. No.: 569,891

[30] Foreign Application Priority Data

May 1, 1974 United Kingdom............ 19106/74

[52] U.S. Cl.................... 426/573; 426/653; 426/654
[51] Int. Cl.² ............................................ A21D 2/08
[58] Field of Search .......... 426/653, 549, 573, 602, 426/601

[56] References Cited

UNITED STATES PATENTS

| | | | |
|---|---|---|---|
| 2,871,124 | 1/1959 | Kuhrt et al..................... | 426/653 X |
| 3,310,408 | 3/1967 | Hansen ............................. | 426/653 |
| 3,379,535 | 4/1968 | Landfried et al. ................ | 426/653 |
| 3,592,660 | 7/1971 | Neu .................................. | 426/653 |

Primary Examiner—Raymond N. Jones
Attorney, Agent, or Firm—Kaufman & Kramer

[57] ABSTRACT

This invention concerns emulsifier blends containing essentially $C_{14}$–$C_{22}$ monoglycerides, fatty acids and ionic surfactants and optionally diglycerides.

Preparation data for homogeneous emulsifier blends is given together with a process for preparing emulsifier gels containing the blends which gels are homogeneous liquid-crystalline dispersions useful in foodstuffs — particularly baked goods.

11 Claims, No Drawings

EMULSIFIER SYSTEMS

This invention relates to compositions which are useful for aerating foodstuffs for use, for example, in the baking industry, and particularly to emulsifier systems containing monoglycerides of $C_{14}$–$C_{22}$ saturated fatty acids as the major fat-based component.

When simple monoglyceride compositions have to be dispersed in water, the monoglyceride-water mixtures must, in general, be heated above the chain-melting temperature of the monoglyceride (Krafft point, $T_c$, approximately 50°–60° C). This process results in the formation of liquid-crystalline dispersions with a high degree of activity. When such dispersions are cooled to below approximately 40° C they transform to gels with a similar high degree of activity. However, in a short space of time these gels tend to revert to crystalline co-gels with poor activity. To re-activate such co-gels it is necessary to re-disperse the system at 50°–60° C.

Various attempts have been made to prepare monoglyceride containing emulsifier systems so that the derived aqueous gels will retain their aerating ability even after storage for considerable periods at ambient temperatures. For example, a blend of monoglyceride and 1,2-propylene glycol $C_{14}$–$C_{22}$ saturated fatty acid monoester has been suggested. In order to achieve the desired stability, this monoester is combined with monoglyceride in an amount varying from 40–65 mole % by weight of the monoglyceride. To further improve the stabilising effect, the use of a combination of the above mono-ester and certain ionic surface active salts having a hydrophilic/lipophilic balance of at least 16 has also been suggested. In general, however, the above methods of stabilising are not economically attractive as the 1,2-propylene glycol monoester is expensive.

It has now been discovered that certain combinations of monoglyceride diglyceride and free fatty acid, in the presence of an ionic surfactant (especially a fatty acid soap) can be dispersed in water at 50°–75° C to give dispersions with good aerating power. On cooling, such dispersions yield gels which retain similar aerating properties during storage at ambient temperatures.

It has also been discovered that the texture of sponge cakes baked from batters aerated with such gels can be varied at will from coarse to fine by the judicious incorporation of some diglyceride into the fat-based emulsifier composition at the expense of monoglyceride or free fatty acid.

The aerating properties of emulsifier gels are conveniently quantified in terms of batter specific volume (BSV) in relation to an appropriate cake batter or the like.

The work on which the present invention is based was carried out in relation to a cake batter described later and generally a BSV of at least 1.8 should be achieved when using a stored emulsifier gel although it will be appreciated that the BSV will vary for different formulations and different storage conditions.

In its broadest aspect this invention provides an emulsifier blend comprising:
50–88% w/w $C_{14}$–$C_{22}$ monoglyceride,
2–40% w/w $C_{14}$–$C_{22}$ saturated fatty acid,
0–30% w/w $C_{14}$–$C_{22}$ diglyceride, and
2–6% w/w ionic surfactant.

Gels from emulsifier blends of this invention are generally stable for up to 6 days or longer.

In a preferred form, this invention provides an emulsifier blend in which the fatty acid is in the range 15–40% w/w when the diglyceride content is below 5% w/w and in which the fatty acid content is in the range 2–20% w/w when the diglyceride content is above 5% w/w and in which the total of fatty acid and diglyceride in the first blend is at least 15% w/w and in the second blend at least 25% w/w.

If amounts of fatty acid greater than 40% w/w of the blend are used, the aerating properties of the freshly prepared dispersion and the stored gels adversely affected.

In a further embodiment the invention provides a process for the preparation of a blend which comprises heating together the requisite quantities of monoglyceride, fatty acid, diglyceride and ionic surfactant at a temperature and for a time sufficient to ensure the formation of a homogeneous melt and subsequently solidifying and optionally powdering the said melt. Preferably the above materials are heated together at 80° –100° C for a period of 15–30 minutes.

It is possible to effect simultaneous blending of the monoglyceride, diglyceride, or fatty acid and ionic surfactant. Alternatively, a blend of monoglyceride diglyceride and fatty acid can first be prepared, followed by addition and blending of the ionic surfactant. Blending of a mixture of monoglyceride and ionic surfactant, especially an alkali metal soap, requires careful control as there is a possibility that interesterification can take place to give an excessive increase in diglyceride levels with resulting adverse effects on the aerating properties of the blends.

The present invention also provides aqueous gels containing 20–40% w/w, preferably 25–30% w/w, of the above defined blend and 60–80% w/w, preferably 70–75% w/w, water.

Conversion of the blends of the invention into aqueous dispersions and gels with high aerating activity can be achieved by heating well-stirred mixtures of the blends (1 part by weight) and water (2–4 parts by weight) at a temperature of between 50° and 75° C until homogeneous liquid-crystalline dispersions are formed. These highly active dispersions rapidly transform to active gels on cooling to ambient temperature.

It is also possible to prepare the blends and gels of the invention by dispersing the individual components of the blends in water, either simultaneously or in sequence, when the monoglyceride and soap are dispersed prior to addition of the other components. The appearance and performance of such aqueous gels are marginally inferior to that of gels prepared from the heat blended compositions.

Conveniently, the monoglyceride used for the preparation of the homogeneous blends is a commercially available saturated distilled material containing 70–99% w/w monoglyceride, 1–20% w/w diglyceride and 1–6% by weight free glycerol. The commercial monoglyceride may contain up to 5% weight unsaturated monoglyceride. Preferably the homogeneous blend will contain 50–70% by weight monoglyceride.

The diglyceride in the homogeneous blend of the invention is essentially saturated in character and has a similar chain length distribution to that present in the monoglyceride. The presence of diglyceride may be achieved by selecting a commercial soaped distilled monoglyceride containing diglyceride, or by adding a suitable proportion of commercial mono-diglyceride to the monoglyceride, or by adding diglyceride per se to the monoglyceride. If the diglyceride is derived from commercial mono-diglyceride the final blend will also contain a low level of triglyceride which is not detrimental to the performance of the gel blend.

The fatty acid component in the homogeneous blend of the invention is essentially saturated in character and preferably of a chain length similar to that used in forming the ester group of the monoglyceride. Representative examples of suitable fatty acids include stearic acid, palmitic acid and their mixtures (e.g. tallow fatty acids). The amount of diglyceride in the blend is governed by the cake texture required but will be in the range 0–30%. Blends with low levels of diglyceride (0–10%) give cakes with coarser textures than blends with higher levels (10–30%) of diglyceride. Blends with more than 30% diglyceride yield gels with stiff texture, poor appearance and poor aerating performance.

Preferably the ionic surfactant is a sodium or potassium soap of a fatty acid or a fatty acid composition, the fatty acid groups of which are substantially identical to those used in forming the monoglyceride. The fatty acid used in the soap may, optionally, contain a high proportion of unsaturated fatty acid material. The surfactant may also be cationic in nature although food regulations strictly limit the number of materials of this type which can be used.

In order that the beneficial effect of the invention can be observed, the level of ionic surfactant used should be at least 2% by weight of the monogeneous dry blend. Preferably the amount of surfactant which is used varies from 4–6% by weight of the blend. Above 6% w/w, the homogeneous blend shows no useful improvement in stability performance.

The performance of dispersions and gels prepared from the homogeneous blends of the invention is readily evaluated by observation of their capability to aerate sponge cake batters prepared according to a standard recipe as set out in Table 1.

TABLE 1

| Recipe for preparation of sponge cake batters | | | | | |
|---|---|---|---|---|---|
| Ingredients | Weight (g) | % | Ingredients | Weight (g) | % |
| Fresh eggs | ca. 190.0* | 19.6 | Castor sugar | 320.0 | 33.0 |
| Water | 120.0 | 12.4 | Milk powder | 24.4 | 2.50 |
| Gel or dispersion | 12.2 | 1.25 | Baking powder | 12.2 | 1.25 |
| Cake flour | 290.0 | 29.9 | | | |

*Frozen pasteurised egg or the content of four standard fresh eggs.

The batter ingredients are conveniently mixed in a 5 quart Hobart stainless steel bowl. The gel or dispersion is distributed in the water by hand whisking before the addition of egg and the sieved, dry ingredients. The resulting mixture is worked to a smooth paste by stirring at speed 1 for 1.5 minutes and then aerated at speed 3 or 4 minutes. Batter specific volume (BSV) measurements are made in duplicate using an overrun cup.

A comparison of the BSV values for batters prepared using gels of different ages provides a reliable guide as to the stability of the gel during storage. It has been found possible to produce an aqueous gel which is stable for at least 150 days at ambient temperature with the aid of a blend containing 64% by weight tallow-based monoglyceride, 30% by weight tallow fatty acids and 6% by weight sodium soap of tallow acid.

The invention is now further described with reference to the following examples. Examples 1–5 relate to the storage stability of gels derived from the blends of the invention as measured by the ability of such gels to aerate batters. Examples 6–9 show how the level of diglyceride in the blend affects the texture of cakes baked from such aerated batters.

EXAMPLE 1

Three separate blends of saturated monoglyceride saturated fatty acid soap, and saturated free fatty acid were prepared having the composition set out in Table 2 below:

TABLE 2

| Component | Blend | | |
|---|---|---|---|
| | 1 | 2 | 3 |
| Monoglyceride (%) | 88 | 78 | 68 |
| Soap (%) | 2 | 2 | 2 |
| Free fatty acid (%) | 10 | 20 | 30 |

The monoglyceride used was a distilled commercial grade containing 96% w/w monoglyceride and about 1% w/w each of diglyceride, free fatty acid, glycerol and water. All of the ingredients were derived from commercial hydrogenated tallow acid fractions. The monoglyceride had a fatty acid composition of 63% stearate and 27% palmitate; the free fatty acid 54% stearic and 42% palmitic and the soap 62% stearate and 32% palmitate, remainders consisting of $C_{14}$ and other acids (all percentages being by weight).

The tallow acid and monoglyceride were stirred at 90°–95° C for about 15 minutes until a homogeneous melt had formed. The soap was subsequently added to this melt and the stirring continued at 90°–95° C for a further 20 minutes until a homogeneous melt had again formed. This was rapidly cooled and the resultant solid product powdered.

One part by weight of the first of the above prepared blends was dispersed in three parts by weight of water at 55°–60° C with stirring over 5–10 minutes. The other blends were similarly dispersed. Aliquots of each freshly prepared dispersion were used immediately for the aeration of sponge cake batters prepared from the recipe set out in Table 1.

The major portion of each dispersion was transformed to the gel form on cooling to ambient temperature (20°–25° C). The aerating abilities of these gels were determined over a period of 24 days' storage at 20°–25° C.

The results obtained are set out in Table 3; it can be seen that the storage stability of the gels increases as the free fatty acid content of the homogeneous blends increases from 10–30% w/w.

TABLE 3

| Days Storage | BSV | | |
|---|---|---|---|
| | Blend 1 | Blend 2 | Blend 3 |
| 1 | 2.26 | 2.00 | 1.84 |
| 2 | 1.46 | 1.84 | 1.93 |

TABLE 3-continued

| Days Storage | BSV Blend 1 | Blend 2 | Blend 3 |
|---|---|---|---|
| 3 | — | 1.62 | 1.95 |
| 9 | — | — | 1.85 |
| 16 | — | — | 1.82 |
| 23 | — | 1.53 | — |
| 25 | — | — | 1.83 |

Where dashes occur in the above table no BSV's were determined.

EXAMPLE 2

Three blends of monoglyceride, free fatty acid (FA) and soap derived from commercial hydrogenated tallow acid feedstocks were prepared by a method as described in Example 1. The quantity of soap used to form these blends was increased to 6% w/w, the quantity of free fatty acid was kept constant while the quantity of monoglyceride was decreased in order to accommodate the increased quantity of soap.

Aqueous dispersions and gels of these blends were prepared and evaluated for aerating abilities as described in Example 1. The results obtained are set out in Table 4, and show that the storage stability of these gels increases dramatically as the fatty acid content of the homogeneous blends increases from 10-30% w/w overall. The best aeration values for the stored gels of blends with 6% w/w soap (BSV 2.2-2.3) were higher than those observed for the gels of blends with 2% w/w soap (BSV 1.8-1.9).

TABLE 4

| Days Storage | BSV Blend 1 (10% FA/6% Soap) | Blend 2 (20% FA/6% Soap) | Blend 3 (30% FA/6% Soap) |
|---|---|---|---|
| 1 | 2.12 | 2.20 | 2.24 |
| 2 | 2.04 | 2.29 | 2.29 |
| 6 | 1.55 | 1.77 | 2.35 |
| 14 | — | 1.72 | 2.30 |
| 139 | — | — | 2.20 |

Where dashes occur in the above table no BSV's were determined.

EXAMPLE 3

A series of monoglyceride-fatty acid-soap blends was prepared using the ingredients and method described in Example 1. The soap content was kept constant at 6% w/w while the fatty acid (FA) and monoglyceride (MG) contents were varied from 12-42% w/w and 52-82% w/w respectively. The aerating abilities of aqueous gels prepared from these blends as described in Example 1 were evaluated using the standard sponge cake recipe after storage of the gels at ambient temperatures (about 20° C) for 12 days and 61 days respectively. The results set out in Table 5 show that blends containing about 30% by weight fatty acid provide the best gels with respect to aerating ability and storage stability.

TABLE 5

| Blend | BSV (12 days) | BSV (61 days) |
|---|---|---|
| 1. 12% FA/82% MG | 1.56 | — |
| 2. 18% FA/76% MG | 2.03 | 1.76 |
| 3. 21% FA/73% MG | 2.22 | 2.12 |
| 4. 24% FA/70% MG | 2.20 | 2.22 |
| 5. 30% FA/64% MG | 2.27 | 2.36 |
| 6. 33% FA/64% MG | 2.20 | 2.24 |

TABLE 5-continued

| Blend | BSV (12 days) | BSV (61 days) |
|---|---|---|
| 7. 36% FA/58% MG | 2.06 | 2.08 |
| 8. 39% FA/55% MG | 1.96 | 1.88 |
| 9. 42% FA/51% MG | 1.90 | 1.74 |

Where a dash occurs in the above table the BSV was not determined.

EXAMPLE 4

A number of monoglyceride-fatty acid-soap blends in which the concentration and/or type of soap component was varied, was prepared and converted to aqueous gels as described in Example 1 in the recipe of Table 1. The compositions of the blends and the performance of the resulting gels is given in Table 6.

TABLE 6

Compositions of blends containing different amounts of soap and the performance of their aqueous gels

| Blend No. | Composition (% w/w)*+ MG | FA | Soap | Aeration ability of gel (BSV) After 30 days | After 60 days |
|---|---|---|---|---|---|
| 1 | 71 | 27 | 2 | 1.80 | not determined |
| 2 | 69 | 27 | 4 | 2.24 | 2.27 |
| 3 | 67 | 27 | 6 | 2.25 | 2.28 |
| 4 | 67 | 27 | 6 | 2.08 | 2.09 |

*MG, monoglyceride; FA, fatty acid.
+Blends 1-3 contain sodium soaps of hydrogenated tallow acids; blend 4 contains sodium oleate as the soap component.

Results show that gels prepared from blends with 6% w/w and 4% w/w saturated fatty acid soap are superior in aerating performance to those prepared with 2% w/w saturated fatty acid soap. Gels prepared from blends with 6% w/w unsaturated fatty acid soap are satisfactory, but less effective as aerating agents then gels with 6% w/w saturated fatty acid soap.

EXAMPLE 5

The following experiments were also carried out to demonstrate the aerating ability of gels prepared from homogeneous blends containing monoglyceride, soap and varying proportions of fatty acid and diglyceride. The compositions chosen are set out below in Table 7 on compositions of Table 1.

TABLE 7

The composition of monoglyceride-fatty acid and/or diglyceride-soap blends and the performance of their aqueous gels

| Blend No. | Composition (% w/w)* MG | FA | DG | Soap | Aeration ability (BSV) of gel 25 days | 60 days |
|---|---|---|---|---|---|---|
| 1 | 64 | — | 30 | 6 | 1.75 | not determined |
| 2 | 64 | 7 | 23 | 6 | 1.93 | 1.80 |
| 3 | 64 | 10 | 20 | 6 | 1.86 | 1.88 |
| 4 | 64 | 15 | 15 | 6 | 2.08 | 2.00 |
| 5 | 64 | 30 | — | 6 | 2.28 | 2.25 |

*MG, monoglyceride; FA, fatty acid; DG, diglyceride.

Aqueous gels were prepared with each of these blends by the method described in Example 1 and their aeration ability (BSV) determined on the recipe of Table 1 after 25 days and 60 days' storage at ambient temperature respectively.

The results of these experiments show that the presence of appreciable amounts of diglyceride in the homogeneous blends reduces the aerating capability of the gels prepared from such blends but does not, in general, significantly impair the storage stability of these gels over a 60-day period.

Similar experiments using gels prepared from blends substantially devoid of free fatty acid and containing 0–20% diglyceride showed that the initial aerating ability of these gels was good but that this ability deteriorated rapidly when such gels were stored for a few days or weeks.

EXAMPLE 6

Table 8 below shows how the BSV and the CSV and texture of cakes varies according to the amount of diglyceride present in the emulsifier blends used for preparing the aqueous gels. All of the fat blends were derived from a commercial hydrogenated tallow monoglyceride and in blend nos. 821–823 inclusive and 842–845 inclusive the diglyceride level derived from a commercial mono/diglyceride composition was increased at the expense of the free fatty acid component, while for blend nos. 824–826 inclusive the diglyceride level was increased at the expense of the monoglyceride component. It is evident for both series of blends that cake texture becomes progressively finer as the diglyceride content of the blend is raised to 15% but further increase has no effect.

TABLE 8

| Blend No. | Composition (% w/w)* | | | | Age of gel (days) | BSV+ | CSV+ | Cake texture |
|---|---|---|---|---|---|---|---|---|
| | MG | FA | DG | Soap | | | | |
| 821 | 62 | 30 | 2 | 6 | 155 | 1.95 | 4.43 | Very open |
| 822 | 62 | 20 | 12 | 6 | 155 | 1.95 | 4.23 | Slightly open & even |
| 823 | 62 | 16 | 16 | 6 | 155 | 1.90 | 4.42 | Slightly open & even |
| 824 | 57 | 30 | 7 | 6 | 155 | 1.90 | 4.28 | Slightly open & even |
| 825 | 52 | 30 | 12 | 6 | 155 | 1.77 | 4.08 | Open & slightly irregular |
| 826 | 50 | 29 | 15 | 6 | 155 | 1.70 | 4.25 | Slightly open & even |
| 842 | 62 | 16 | 16 | 6 | 40 | 1.81 | 4.42 | Close and even |
| 843 | 62 | 11 | 21 | 6 | 40 | 1.81 | 4.32 | Close and even |
| 844 | 62 | 7 | 25 | 6 | 40 | 1.81 | 4.30 | Close and even |
| 845 | 62 | 2 | 30 | 6 | 40 | 1.81 | 4.30 | Close and even |

*MG, monoglyceride; FA, fatty acid; DG, diglyceride.
+BSV, batter specific volume; CSV, cake specific volume (volume of 1 g cake as measured by rapeseed displacement).

EXAMPLE 7

TABLE 9

The composition of monoglyceride-fatty acid and/or diglyceride-soap blends based on monoglycerides from hydrogenated lard and the performance of their aqueous gels

| Blend No. | Composition (% w/w)* | | | | Age of gel (days) | BSV+ | CSV+ | Cake texture |
|---|---|---|---|---|---|---|---|---|
| | MG | FA | DG | Soap | | | | |
| 831 | 62 | 25 | 7 | 6 | 38 | 2.00 | 4.34 | Close and even |
| 832 | 62 | 21 | 11 | 6 | 38 | 1.95 | 4.37 | Close and even |
| 833 | 62 | 16 | 16 | 6 | 38 | 1.95 | 4.38 | Close and even |
| 834 | 62 | 11 | 21 | 6 | 38 | 1.90 | 4.32 | Close and even |
| 835 | 62 | 7 | 25 | 6 | 38 | 1.86 | 4.22 | Very close & even |
| 836 | 62 | 2 | 30 | 6 | 38 | 1.86 | 4.26 | Very close & even |

*MG, monoglyceride; FA, fatty acid; DG, diglyceride
+BSV, batter specification volume; CSV, cake specific volume (volume of 1 g cake as measured by rapeseed displacement).

In the absence of diglyceride gels derived from blends containing a lard-based monoglyceride give cakes with coarser texture than blends containing a tallow-based monoglyceride. However, progressive substitution of the free fatty acid of the lard-based blends with diglyceride gives gels which yield cakes with increasing finer texture, as was the case with tallow-based blends.

What is claimed is:
1. An emulsifier blend comprising:
   50–88% w/w $C_{14}$-$C_{22}$ monoglyceride;
   2–40% w/w $C_{14}$-$C_{22}$ saturated fatty acid;
   0–30% w/w $C_{14}$-$C_{22}$ diglyceride, and
   2–6% w/w ionic surfactant.
2. An emulsifier blend as claimed in claim 1 in which the fatty acid is in the range 15–40% w/w and the diglyceride content is below 5% w/w and in which the total percent of fatty acid and diglyceride is at least 15% w/w.
3. An emulsifier blend as claimed in claim 1 in which the fatty acid is in the range 2–20% w/w and the diglyceride content is above 5% w/w and in which the total fatty acid and diglyceride content is at least 25% w/w.
4. A blend as claimed in claim 1 in which the ionic surfactant is a sodium or potassium soap of a fatty acid.
5. A blend as claimed in claim 4 in which the proportion of ionic surfactant present is between 4 and 6% w/w.
6. A blend as claimed in claim 1 in which the fatty acid or fatty acid groups are derived from a similar carbon length fatty acid.
7. A process for the preparation of a blend as claimed in claim 1 comprising heating together the requisite quantities of monoglyceride, fatty acid, diglyceride and ionic surfactant at a temperature and for a time sufficient to ensure the formation of a homogeneous melt and subsequently solidifying and optionally powdering the said melt.
8. A process as claimed in claim 8 in which the materials are heated together at a temperature of 80°–100° C for a period of 15–30 minutes.
9. An aqueous gel containing 20–40% w/w of a blend as claimed in claim 1 and 80–60% w/w water.
10. An aqueous gel as claimed in claim 9 containing 25–30% w/w of the emulsifier blend.
11. A process for the preparation of a gel as claimed in claim 9 comprising heating a well-stirred mixture of water and the emulsifier blend at a temperature between 50° and 75° C until a homogeneous liquid-crystalline dispersion is formed.

* * * * *

UNITED STATES PATENT OFFICE
CERTIFICATE OF CORRECTION

Patent No. 3,995,069      Dated November 30, 1976

Inventor(s) Peter Conroy Harries

It is certified that error appears in the above-identified patent and that said Letters Patent are hereby corrected as shown below:

On the Title Page, in item [73] before "Internationale" -- NV -- should be inserted.

Signed and Sealed this

Twenty-fourth Day of May 1977

[SEAL]

Attest:

RUTH C. MASON
*Attesting Officer*

C. MARSHALL DANN
*Commissioner of Patents and Trademarks*